US012648519B2

(12) United States Patent　　　　　(10) Patent No.: US 12,648,519 B2
Hermann　　　　　　　　　　　　　　　(45) Date of Patent: Jun. 9, 2026

(54) MATERIAL FLOW SENSING SYSTEM IN A COMBINE HARVESTER

(71) Applicant: AGCO International GmbH, Neuhausen (CH)

(72) Inventor: Dan Hermann, Randers (DK)

(73) Assignee: AGCO International GmbH, Neuhausen am Rheinfall (CH)

( * ) Notice: Subject to any disclaimer, the term of this patent is extended or adjusted under 35 U.S.C. 154(b) by 644 days.

(21) Appl. No.: 18/005,005

(22) PCT Filed: Jun. 24, 2021

(86) PCT No.: PCT/IB2021/055623

§ 371 (c)(1),
(2) Date: Jan. 10, 2023

(87) PCT Pub. No.: WO2022/023834

PCT Pub. Date: Feb. 3, 2022

(65) Prior Publication Data

US 2023/0247940 A1　　　Aug. 10, 2023

(30) Foreign Application Priority Data

Jul. 31, 2020　(GB) ..................................... 2011957

(51) Int. Cl.
*A01D 41/127*　　　(2006.01)
*A01F 12/44*　　　(2006.01)

(52) U.S. Cl.
CPC ..... *A01D 41/1276* (2013.01); *A01D 41/1272* (2013.01); *A01F 12/444* (2013.01); *A01F 12/448* (2013.01)

(58) Field of Classification Search
CPC ............ A01D 41/1272; A01D 41/1276; A01D 41/127; A01F 12/32; A01F 12/48;
(Continued)

(56) References Cited

U.S. PATENT DOCUMENTS 9,980,435 B2　　5/2018　Mackin et al.
2016/0000008 A1　1/2016　Schøler et al.
(Continued)

FOREIGN PATENT DOCUMENTS

WO　　　2020126211 A1　6/2020

OTHER PUBLICATIONS

UK Intellectual Property Office, Search report for related UK Application No. GB2011957.4 , dated Jan. 25, 2021, 4 pages.
(Continued)

*Primary Examiner* — Joseph M Rocca
*Assistant Examiner* — Robert E Pezzuto

(57) ABSTRACT

A combine harvester (10) comprises a sensing device (60) to detect or estimate a volume of material other than grain (MOG) flowing through crop processing apparatus. The sensing device (60) is in communication with a controller (101) and is arranged forward of, and below, a front edge (32') of a return pan (32) which serves to catch crop material falling from overhead separating apparatus (20). The sensing device (60) generates one or more light beams (68) which are directed across a path of a crop mat (80) as the mat falls under gravity from the front edge (32'). The controller (101) is configured to generate one of a fan speed setting and a sieve opening setting in dependence upon detection signals that are generated by the sensing device (60).

14 Claims, 4 Drawing Sheets

(58) Field of Classification Search
CPC .... A01F 12/444; A01F 12/446; A01F 12/448;
G01F 23/263
See application file for complete search history.

(56) References Cited

U.S. PATENT DOCUMENTS

| 2017/0150680 A1* | 6/2017 | Moutton | ............... | G01F 23/263 |
| 2018/0242522 A1 | 8/2018 | Duquesne et al. | | |
| 2019/0141893 A1* | 5/2019 | Vandike | ............. | A01D 41/1273 |
| | | | | 460/1 |
| 2019/0274253 A1 | 9/2019 | Wold et al. | | |
| 2020/0196531 A1 | 6/2020 | Hermann et al. | | |

OTHER PUBLICATIONS

European Patent Office, International Search Report related to
International Patent Application No. PCT/IB2021/055623, mail
date Sep. 24, 2021, 13 pages.

* cited by examiner

MATERIAL FLOW SENSING SYSTEM IN A COMBINE HARVESTER

CROSS-REFERENCE TO RELATED APPLICATIONS

This application is a national phase entry under 35 U.S.C. § 371 of International Patent Application PCT/IB2021/055623, filed Jun. 24, 2021, designating the United States of America and published in English as International Patent Publication WO 2022/023834 A1 on Feb. 3, 2022, which claims the benefit of the filing date of U. K. Patent Application 2011957.4 "Material Flow Sensing System In A Combine Harvester," filed Jul. 31, 2020, the entire disclosure of which is incorporated herein by reference.

FIELD OF THE INVENTION

The invention relates to combine harvesters having threshing apparatus, separating apparatus, a grain cleaning system located downstream of the separating apparatus, and a material conveyance system arranged to convey crop material from the separating apparatus to the grain cleaning system, wherein the grain cleaning system comprises screening apparatus, and a fan arranged to generate a cleaning airstream through the screening apparatus. The invention also relates to a method of controlling a combine harvester having a grain cleaning system.

BACKGROUND OF THE INVENTION

The process of harvesting grain from crop fields has not changed substantially for many decades. Farmers use combine harvesters to cut a standing crop, thresh the crop material, separate the grain from the stem and clean the grain whilst returning the crop material residue onto the field. Typically, combine harvesters include threshing apparatus, separating apparatus and a grain cleaning system.

Grain cleaning systems utilise screening apparatus which typically includes one or more sieves driven in an oscillating motion. A mixture of grain, chaff, unthreshed heads and straw is delivered to an uppermost sieve upon which the mixture is conveyed across the surface thereof. Hereinafter the chaff and straw will be referred to as 'MOG', Material Other than Grain.

Generally speaking, clean grain finds its way down through the sieves to a collection trough. A fan is provided to generate a cleaning airstream through the cleaning apparatus. The cleaning airstream is directed through and/or over the sieves so as to lift and carry the MOG away from the surface of the sieves and eject it from the cleaning system. The sieves are generally set up to screen the unthreshed heads which are 'returned' as tailings to a rethreshing system.

Today it is known to provide combines with control systems that automatically adjust settings of the various crop processing apparatus. Such "auto-setting" functionality relieves the operator of making manual adjustments to optimise the harvesting process, wherein the optimum settings continuously change as harvest conditions vary. However, for reliable auto-setting operation an accurate representation of the current conditions within the various processing apparatus is required.

SUMMARY OF THE INVENTION

According to a first aspect of the invention there is provided combine harvester having threshing apparatus, separating apparatus, a grain cleaning system located downstream of the separating apparatus, a material conveyance system arranged to convey crop material from the separating apparatus to the grain cleaning system, and an electronic control unit (ECU). The grain cleaning system comprises screening apparatus having at least one adjustable sieve, and a fan arranged to generate a cleaning airstream through the screening apparatus. The material conveyance system comprises a return pan positioned below the separating apparatus and serving to catch crop material that falls from the separating apparatus and convey said material as a mat in a forward direction to a front edge of the return pan from where said mat falls under gravity. A photoelectric sensing device is in communication with the ECU and is arranged forward of, and below, said front edge to generate a light beam across a path of the mat as the mat falls under gravity. The ECU is configured to generate one of a fan speed setting and a sieve opening setting in dependence upon detection signals generated by the photoelectric sensing device.

By positioning a photoelectric device that passes a light beam across the path of the falling crop mat an indication of the presence or quantity of the crop material can be obtained and used as an input parameter for control of various crop processing systems and sub-systems including, by way of example, the material conveyance system and the grain cleaning system. In operation the light beam is broken by the presence of material, especially MOG, falling from the return pan. The presence of material passing through the light beam can be detected by appropriate processing of the detection signals.

In a simple embodiment, the detection signals represent presence or absence of crop material falling from the front edge of the return pan. This may be utilised as a simple indicator of zero or low upcoming MOG load on the cleaning system which allows the fan speed to be reduced for example. Such an indicator could also indicate a blockage of the return pan, causing a triggering of an alarm to the user for example.

In one embodiment the light beam is positioned forwardly of the front edge by a distance that equates to a threshold or 'trigger' thickness of the mat, wherein a thin mat (low MOG load) does not break the light beam, whereas a mat that is thicker than the threshold thickness (high MOG load) breaks the light beam. This may be utilised as a simple indicator of high upcoming MOG load on the cleaning system which allows the fan speed to be increased for example.

Advantageously, the photoelectric sensing device can be configured to have no or minimal impact on the flow of crop material through the material conveyance system. The hardware of the device can be mounted in a convenient location whilst the light beam is non-invasive upon the flow of crop.

The photoelectric sensing device is preferably mounted to the return pan. Advantageously the light beam therefore oscillates with the return pan resulting in the movement having minimal effect on the detection signals generated by the photoelectric sensing device. In one embodiment first and second members are mounted to the underside of the return pan and extend forwardly of said front edge in a mutually spaced-apart relationship.

The photoelectric sensing device may comprise a light source mounted on the first member and a photodiode on the second member. In this case the light beam passes direct from the light source to the photodiode.

Alternatively, both the light source and the photodiode can be mounted on the first member and a reflective surface is provided on the second member. In this case the light beam is reflected back to the photodiode. An advantage of this arrangement is that the light source and photodiode can be mounted or encased in a single module thus reducing component count and reducing the number of electrical harnesses required.

In another embodiment the photoelectric sensing device comprises a first component mounted to a first sidewall and a second component mounted to a second sidewall, wherein the first and second sidewalls are disposed outboard of the return pan. The sidewalls may form part of the combine frame which remains stationary with respect to any oscillatory movement of the return pan.

The light source is preferably an LEDs or a laser that can be detected by a photo-sensor spaced therefrom.

In a preferred embodiment the photoelectric device comprises a plurality of light sources spaced from one another and arranged to generate a plurality of light beams that are spaced-apart in a fore and aft direction. The plurality of light sources may be provided by a strip of LEDs. In one embodiment the photoelectric device comprises an LED strip sensor.

An aspect of the invention involves the recognition that the crop mat maintains a thickness as it falls under gravity from the front of the return pan. By spacing a plurality of photoelectric sensors in the fore and aft direction across the path of the falling crop mat a measure of the thickness can be obtained.

In one embodiment the ECU is configured to determine from the detection signals a thickness value that is representative of a thickness of the mat. A display device may be provided to display to an operator a representation of a MOG load determined from the thickness value. In one embodiment the representation may be overlaid on a depiction of the inner workings of the combine to assist the operator.

In alternative embodiments the ECU is in communication with one or more sub-system controllers and delivers commands or settings that are based upon the detection signals from the photoelectric device. In one example a fan speed controller is in communication with the ECU and configured to control the fan speed in dependence on a fan speed setting received from the ECU. In another example a sieve controller is in communication with the ECU and configured to control adjustment (opening and closing) of the sieve in dependence on a sieve opening setting received from the ECU.

Any indication of MOG volume, or setting for the fan speed or sieve opening, generated by the ECU from the detection signals may, in one embodiment, be validated or compensated based upon a grain throughput value received from a yield sensor. In one example the yield sensor is mounted inside a clean grain elevator. In the event that the MOG load indicated from the detection signals is proportionally different to the grain throughput value then the ECU may generate an operator alert.

The material conveyance system may further comprise a preparation pan disposed upstream of the screening apparatus and below the threshing apparatus, wherein the mat falls under gravity onto the preparation pan which is located below the front edge of the return pan. In one embodiment the photo electric device is mounted to the preparation pan.

The detection signals may also be exploited by other combine processing sub-systems. In one embodiment a plurality of paddles are pivotally mounted on the return pan. A paddle control actuator is provided for moving the paddles within a range of operable positions, and a paddle controller is in communication with the ECU and configured to control the paddle control actuator. The arrangement may be as disclosed in applicant's co-pending United Kingdom patent application GB1918100.7, the contents of which is incorporated herein by reference. The paddles serve to shift crop material laterally on the return pan to compensate for hillside operation. The ECU may be configured to generate paddle control settings in dependence upon the detection signals. In a preferred arrangement, a plurality of photoelectric devices are provided, each detecting the thickness of the crop mat at different sections across the width of the material conveyance system. As such the ECU is thereby provided with an indication of thickness of the crop mat at different positions across the width, wherein the paddles are controlled accordingly to rebalance any uneven distribution caused by hillside working for example.

According to a second aspect of the invention there is provided a method of controlling a grain cleaning system comprising generating and directing a light beam across a path of a crop material mat as the mat falls from a front edge of a return pan in a combine harvester onto a preparation pan, detecting the light beam and generating detection signals, generating control signals from the detection signals, and controlling one of a fan and a sieve based upon the control signals.

BRIEF DESCRIPTION OF THE DRAWINGS

Further advantages of the invention will become apparent from reading the following description of specific embodiments with reference to the appended drawings in which.

DETAILED DESCRIPTION OF SPECIFIC EMBODIMENTS OF THE INVENTION

Aspects of the invention will now be described in connection with various preferred embodiments implemented on a combine harvester. Relative terms such as front, rear, forward, rearward, left, right, longitudinal and transverse will be made with reference to the longitudinal vehicle axis of the combine harvester travelling in the normal direction of travel. The terms "direction of conveyance", "upstream" and "downstream" are made with reference to the general flow of crop material through the combine harvester, or to the cleaning airstream through the screening apparatus.

Figure 1:
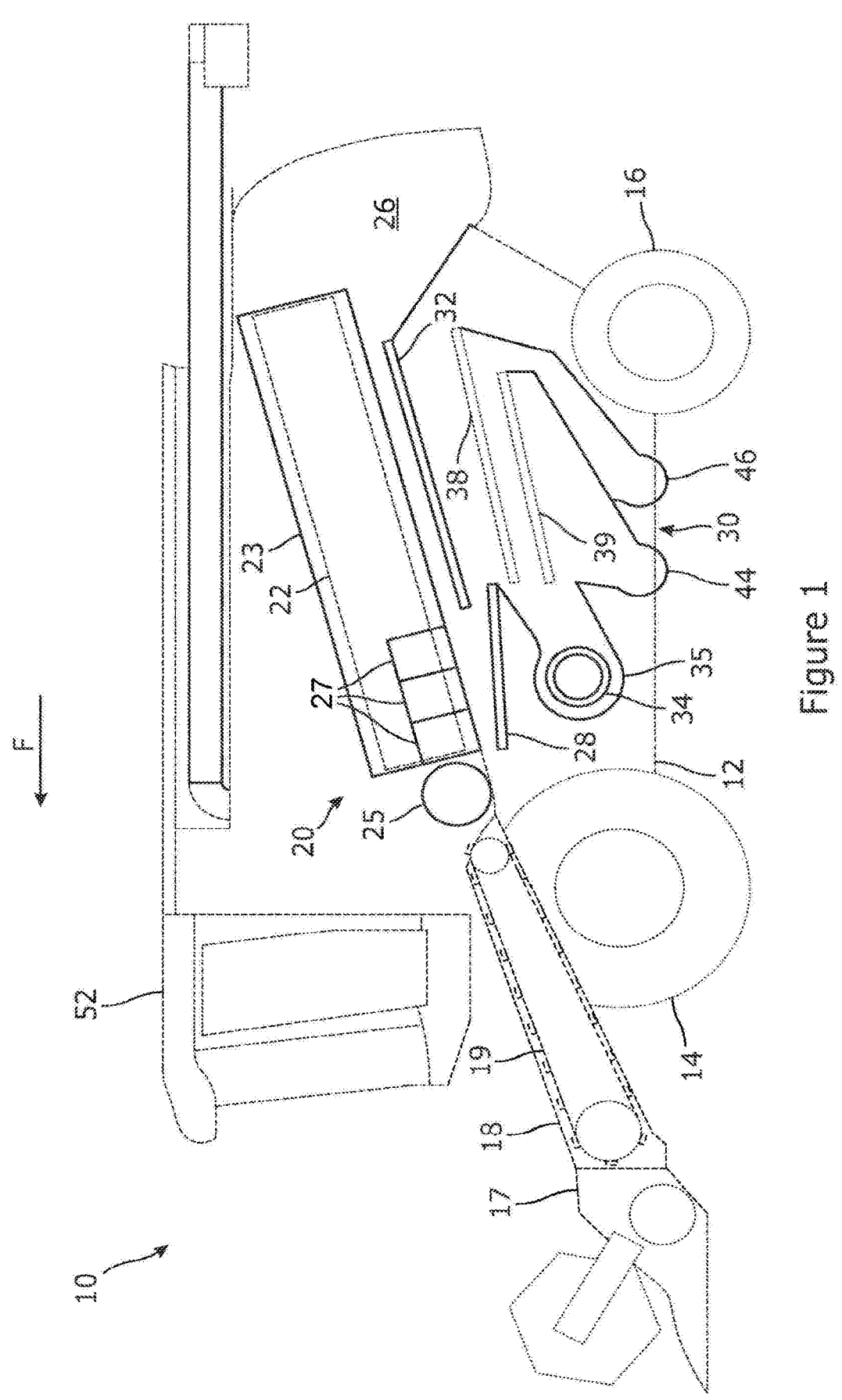
FIG. 1 is a schematic side elevation of a combine harvester in accordance with an embodiment of the invention, shown with the side panels removed to reveal the inside processing systems.

With reference to FIG. 1 a combine harvester 10 includes a frame or chassis 12, front wheels 14 and rear steerable wheels 16. A cutting header 17 is detachably supported on the front of a feederhouse 18 which is pivotable about a transverse axis to lift and lower the header 17 in a conventional manner.

The combine 10 is driven in a forward direction F across a field of standing crop in a known manner. The header 17 serves to cut and gather the crop material before conveying such into feederhouse 18 and elevator 19 housed therein. At this stage the crop stream is unprocessed. It should be understood that combine harvesters are employed to harvest a host of different crops including cereal, rice, beans, corn and grass seed. The following description will make reference to various parts of the cereal crop stream but it should be understood that this is by way of example only and does not by any means limit the applicability of the invention to harvester other crops.

The cut crop stream is conveyed rearwardly from the feederhouse 18 to a processor designated generally at 20. In the illustrated embodiment the processor 20 is of the axial rotary type having a pair of axial-flow threshing and separating rotors 22 which are each housed side-by-side inside a respective rotor housing 23 and are fed at their front end by a feed beater 25. It should be appreciated that the right-hand rotor is hidden from view in FIG. 1. The rotors serve to thresh the crop stream in a front 'threshing' region, separate the grain therefrom in a rear 'separating' region, and eject the straw residue through the rear of the machine 26 either directly onto the ground in a windrow or via a straw chopper (not shown).

Each rotor housing 23 is generally cylindrical and is made up of an opaque upper section and a foraminous lower section which includes a set of side-by-side arcuate concave grate segments 27 extending the length of the front threshing region and which allow the threshed material to fall by gravity onto a shoe preparation pan 28 located below for onward conveyance to a grain cleaning system which is designated generally at 30. Guide vanes (not shown) are secured to the inside of the rotor housing and serve, in conjunction with the crop engaging elements on the rotor 22, to convey the stream of crop material in a generally rearward spiral path from front to rear.

The separating region at the rear portion of rotors 22 comprises plural crop engaging elements (not shown) to separate the residual grain from the stream of crop material. A grain return pan 32 is provided underneath the separating region to collect the separated grain and convey it forwardly for delivery onto the grain collection pan 28. Both the shoe preparation pan 28 and return pan 32 are driven with a drive mechanism so as to oscillate in a known manner.

Although described as a rotary axial type, the processor 20 may be of an alternative type such as known conventional, hybrid or transverse types without departing from the scope of the invention. For example, in the case of a conventional type processor, a transverse cylindrical beater may be provided as threshing apparatus and a set of straw-walkers provided as separating apparatus.

Figure 2:
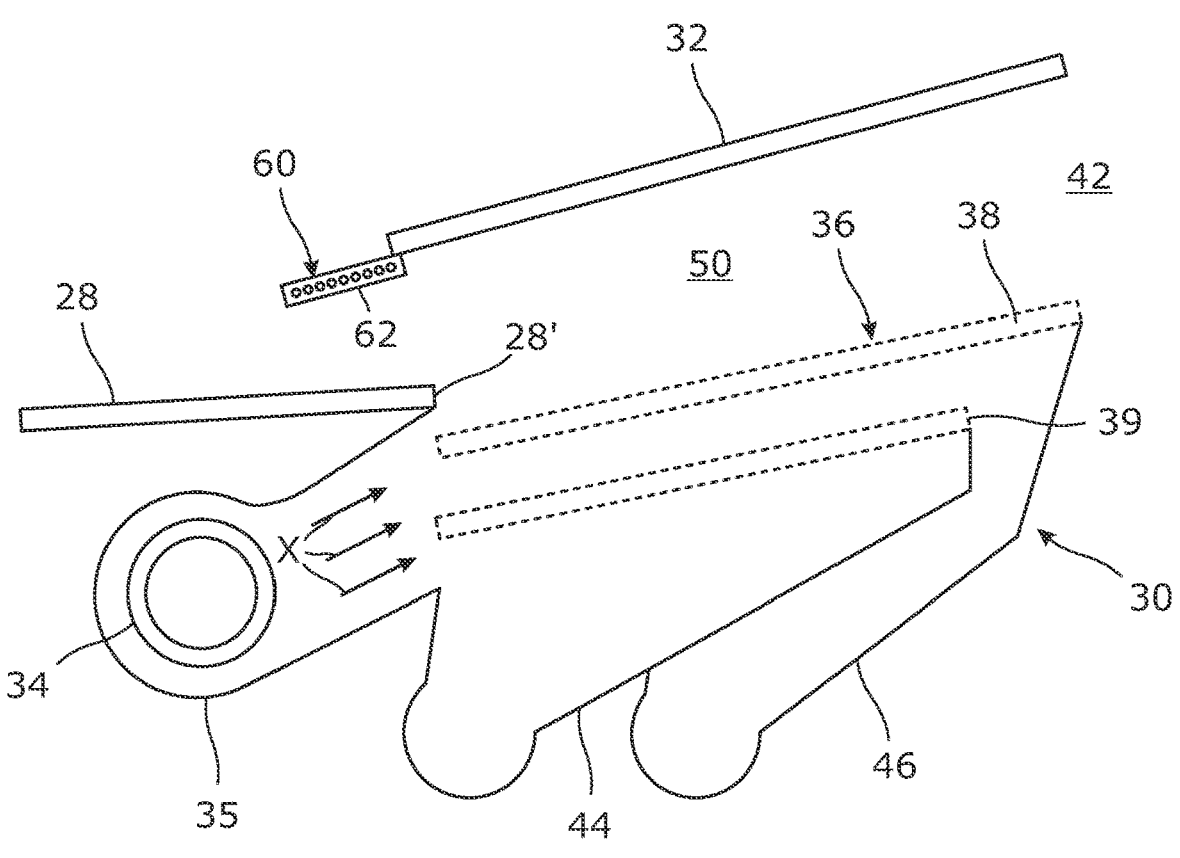
FIG. 2 is a schematic side view of the material conveyance system and grain cleaning system in the combine harvester of FIG. 1.

With reference to FIGS. 1 and 2 the grain cleaning system 30 comprises a fan 34 housed in a fan housing 35. The fan 34 may be of a known type such as a crossflow or centrifugal fan that rotates on a transverse axis and draws in air either tangentially or axially through air intake openings. A cleaning airstream generated by the fan 34 and exhausted from the fan housing 35 is represented in FIG. 2 by arrows 'X'.

The fan 34 is driven by a fan drive system (not shown) which may derive its power via a mechanical drive coupled to the processor 20. Alternatively, the fan 34 may be driven by a hydraulic or electric motor. In any case, the fan drive system is operable to drive the fan 34 with an adjustable speed determined by a fan speed controller 134 (FIG. 6) that is in communication with the fan drive system.

The grain cleaning system 30 further comprises screening apparatus 36 which includes a shoe frame (not shown), upper sieve 38 (alternatively referenced 'chaffer') and a lower sieve 39. The sieves 38,39 are driven with an oscillating motion in a known manner. The sieves 38,39 are mounted between side members of the shoe frame which is suspended on hangers (also not shown) from the frame 12 and driven in an oscillating motion.

It should be understood that the return pan 32 may be shorter than shown wherein crop material falls from the front edge direct into the grain cleaning system 30. In alternative embodiments the preparation pan 28 may be omitted altogether.

The sieves 38,39 each comprise a plurality of transverse louvres which can be adjusted either manually or remotely to adjust the coarseness of the screen provided. The louvres are arranged in a parallel transverse relationship and pivot to adjust the opening or gap between adjacent ones.

The combine 10 comprises a pair of vertical sidewalls 40, 41 (FIG. 4) between which the shoe frame and sieves 38,39 are located. The sidewalls typically form part of the frame 12.

The threshed material comprising a mixture of grain and MOG is conveyed by the shoe preparation pan 28 in a rearward direction until it falls from a rear edge 28' and into the grain cleaning system 30. The cleaning airstream is directed through and over the sieves 38,39 in a known manner so as to lift the lighter material, primarily MOG, away from the surface of upper sieve 38 and in a rearward direction for ejection at a rear outlet 42.

In a known manner, the screening apparatus 36 is operable to allow the clean grain to pass through the sieves 38,39, wherein the clean grain is collected in a transverse clean grain trough 44 and conveyed onwards to an on-board grain tank (not shown). The louvres of upper sieve 38 may be set to allow unthreshed heads to pass through a rear region of the upper sieve 38 into a tailings collection trough 46. Likewise, any material screened out by lower sieve 39 falls from the rear edge thereof into the tailings collection trough 46 from where the 'returns' are fed back to the processor 20 or a dedicated rethreshing system (not shown).

A duct 50 is bounded by the sidewalls, the return pan 32, the clean grain trough 44 and tailings collection trough 46. The duct 50 serves as a channel for the cleaning airstream which is generated at a front end by the fan 34 and exits at the rear outlet 42. The sieves 38,39 are located in the duct 50.

Figure 6:
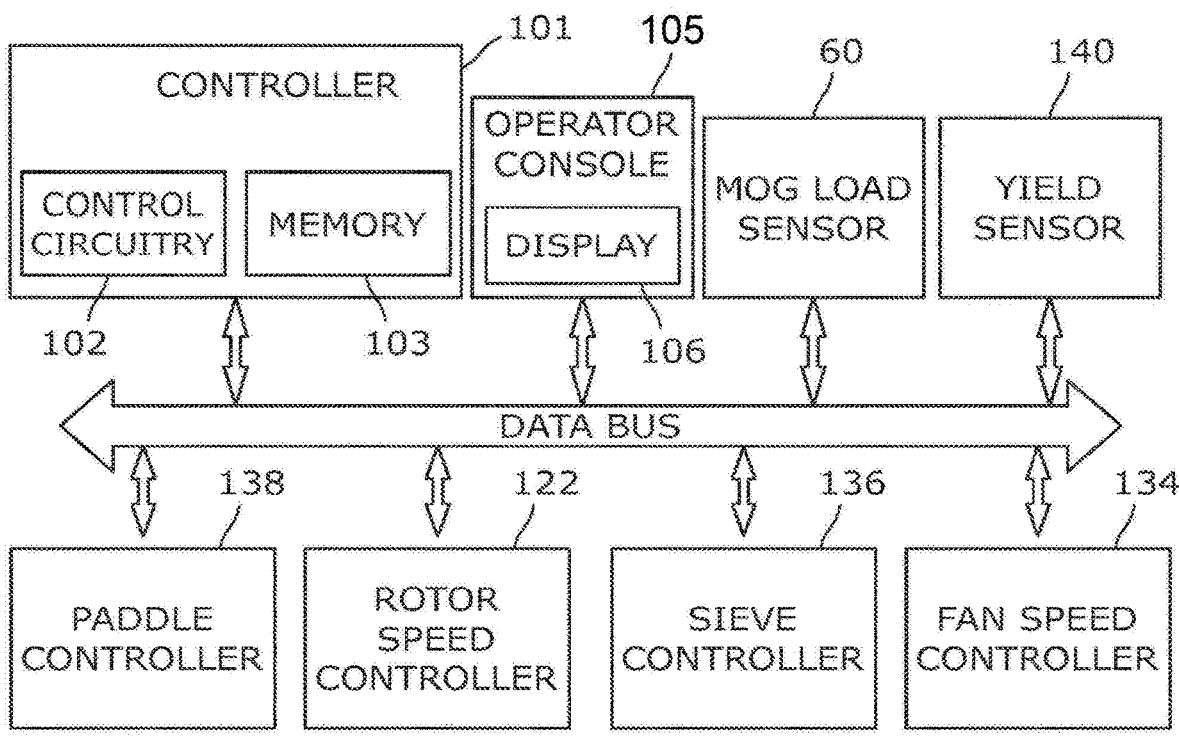
FIG. 6 is a block diagram of the grain cleaning system embodied in the combine harvester of FIG. 1; and, FIG. 7 illustrates a method in accordance with an embodiment.

With reference to FIG. 6, an electronic control unit (hereinafter termed 'ECU') 101 is provided and is in communication (via a databus) with an operator console 105, a rotor speed controller 122, a sieve controller 136, and the fan speed controller 134. The ECU 101 comprise control circuitry 102 which may be embodied as custom made or commercially available processor, a central processing unit or an auxiliary processor among several processors, a semiconductor based micro-processor (in the form of a microchip), a macro processor, one or more applications specific integrated circuits, a plurality of suitably configured digital logic gates, and/or other well-known electrical configurations comprising discrete elements both individually and in various combinations to coordinate the overall operation of the combine 10.

The ECU 101 further comprises memory 103. The memory 103 may include any one of a combination of volatile memory elements and non-volatile memory elements. The memory 103 may store a native operating system, one or more native applications, emulation systems, emulated applications for any of a variety of operating systems and/or emulated hardware platforms, emulated operating systems etc. The memory 103 may be separate from the controller 101 or may be omitted.

The operator console 105 comprises a display 106 which may be integrated as part of a terminal having user interface devices such as buttons, levers and switches. The console 105 is mounted proximate to a drivers work station in cab 52.

The rotor speed controller 122, sieve controller 136, and fan speed controller 134 each serve to control adjustments of respective working units of the combine 10 and may each comprise a local standalone processor and/or memory, or may be integrated into the central ECU 101. Control signals generated by the ECU 101 are communicated to the respective working unit controllers 122,136,134 which are then translated into an adjustment of the associated working unit including the processing rotor 22, sieves 38,39 and fan 34.

Figure 3:
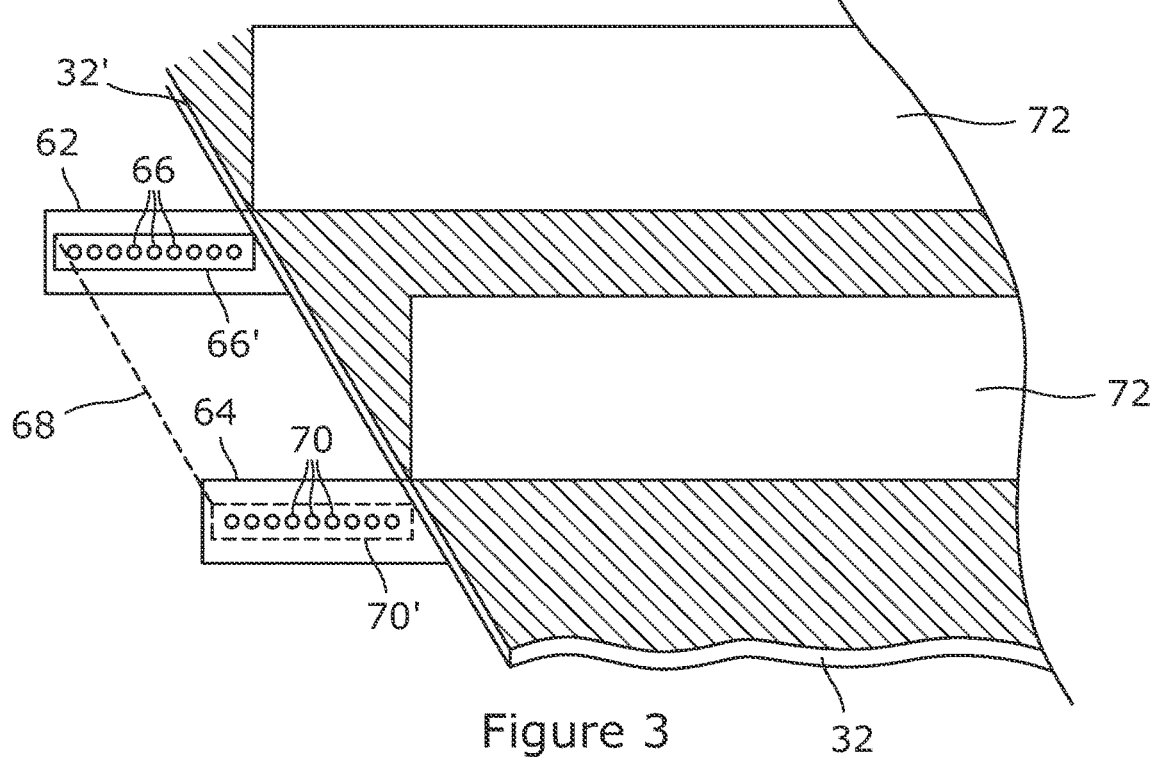
FIG. 3 is a perspective view of the front part of a return pan in accordance with an embodiment.

With reference to FIGS. 2 and 3 which illustrate one embodiment, a MOG load sensor is provided. The MOG load sensor 60 is a photoelectric sensing device which is in communication with the ECU 101 and mounted to a front region of the return pan 32.

First and second bars or members 62, 64 are secured to the underside of the return pan 32 and each extend forward of the front edge 32'. Each member 62,64 is substantially planar and is oriented upright to present lateral major surfaces upon which the components of the MOG load sensor 60 are mounted. Each member preferably extends between 5 and 30 cm of the return pan front edge 32', more preferably between 10 and 20 cm.

The MOG load sensor 60 comprises a strip 66' of LEDs 66 mounted to a vertical face of the first member 62. The LEDs 66 are arranged forward of, and below, the front edge 32' to generate a plurality of light beams across a path of the crop mat as the mat falls under gravity. The LEDs are spaced along the first member 62 in a fore and aft direction (parallel with forward direction F) so that the light beams form a spaced series of beams within a substantially horizontal plane. FIG. 3 illustrates just one light beam 68, although it should be understood that all LEDs 66 in the strip 66' generate respective light beams.

The MOG load sensor 60 further comprises a strip 70' of photodiodes 70 mounted to a vertical face of the second member 64, wherein each photodiode 70 is positioned so as to receive a light beam from a respective one of the LEDs 66. Each photodiode 70 is configured so as to generate a respective detection signal that is communicated to the ECU 101.

The ECU 101 is configured to generate one of a fan speed setting and a sieve opening setting in dependence upon detection signals generated by the MOG load sensor 60.

The return pan 32 is shown in FIG. 3 with optional upright crop dividers 72 that extend longitudinally. When crop dividers 72 are provided on the return pan 32, members 62, 64 are preferably in alignment with the dividers 72 so as to minimise any obstruction to crop flow presented by the members 62,64.

Figure 5:
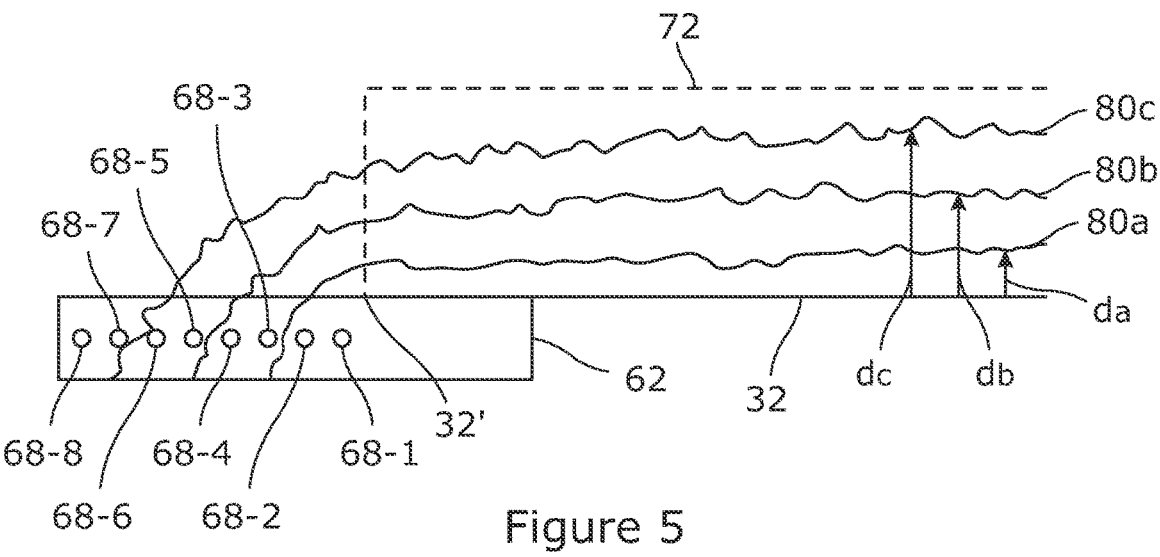
FIG. 5 is a schematic side view of the front portion of a return pan illustrating crop mats having different thicknesses cascading from the front edge of the return pan.

With reference to FIG. 5 a sectional view shows a side profile of the front region of return pan 32 with crop mats 80 thereon having three different thicknesses. Eight light beams 68-1 to 68-8 are shown, directed out of the plane of the page.

A crop mat 80a has a thickness or depth $d_a$. As illustrated, as crop mat 80a is conveyed to the left and cascades from the front edge 32' it obscures the two light beams 68-1 and 68-2 only. Detection signals are communicated from all photo-diodes 70 to the ECU 101, and the ECU generates a thickness value that is representative of a thickness of the mat 80a.

In another example a crop mat 80b has a thickness or depth $d_b$ that is greater than $d_a$. As illustrated, as crop mat 80b is conveyed to the left and cascades from the front edge 32' it obscures the four light beams 68-1, 68-2, 68-3 and 68-4. Detection signals are communicated from all photo-diodes 70 to the ECU 101, and the ECU generates a thickness value that is representative of a thickness of the mat 80b.

In a third example a crop mat 80c has a thickness or depth $d_c$. As illustrated, as crop mat 80c is conveyed to the left and cascades from the front edge 32' it obscures the six light beams 68-1 to 68-6. Detection signals are communicated from all photodiodes 70 to the ECU 101, and the ECU generates a thickness value that is representative of a thickness of the mat 80c.

It can be seen therefore that the number of light beams obscured by the falling crop material is proportional to the thickness of the crop mat and the MOG volume carried on the return pan 32.

Although the illustrated embodiment includes eight LEDs and photodiode pairs, it should be understood that more or less light beams may be employed.

The ECU 101 is operable to generate settings for one or both of the fan speed controller 134 and the sieve controller 136. Furthermore, the ECU 101 is operable in some embodiments to generate settings for the rotor speed controller 122 or a concave controller.

In another embodiment the members 62, 64 extend forwardly from the front edge 32' at an angle away from horizontal. For example, the members 62, 64 may slope upwardly at an angle of 30-45 degrees for example. As such, the light beams 68 are still spaced in a fore and aft direction but are spaced along a line away from horizontal. Angling the alignment upwardly of the plane in which the light beams pass may be advantageous in that the flow of crop material as it falls from the front edge may be in a direction that is not vertical. As such the falling crop mat passes through the plane of light beams nearer to 90 degrees, resulting in a more accurate measurement of the mat thickness.

Although illustrated as extended across only a portion of the width of the return pan 32, it is envisaged that the light beams 68 generated by the MOG load sensor 60 may instead pass across the full width of the front edge 32'. In one embodiment the LEDs 66 and photodiodes are mounted to inside faces of sidewalls 40, 41 respectively, in a region in forward of and below the front edge 32' of return pan 32.

Figure 4:
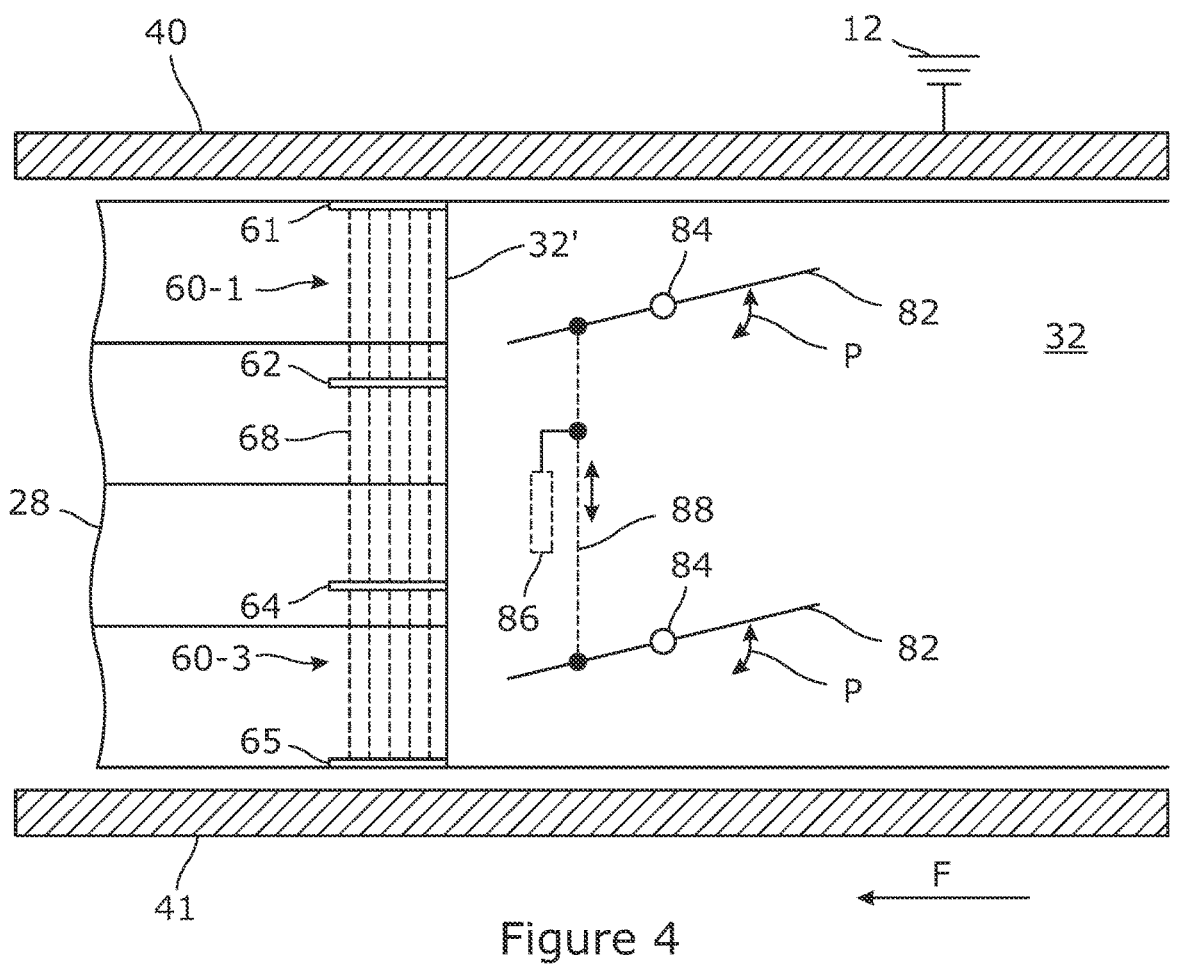
FIG. 4 is an overhead view of a material conveyance system in accordance with another embodiment.

With reference to FIG. 4, an embodiment includes means upon the return pan to compensate for hillside operation, wherein crop material can be shifted laterally. A pair of paddles 82 are pivotally mounted on the return pan 32 so as to be pivotable around pivot axes 84. A paddle control actuator 86 may be mounted underneath the return pan for example, and mechanically coupled to the paddles 82 by an appropriate linkage 88 which is shown only schematically in FIG. 4. Extension and retraction of the paddle control actuator 86 causes the paddles 82 to pivot within a range of operable positions indicated by arrows 'p'.

During operation on a side hill for example, the crop material conveyed generally in the forward direction F on the return pan 32 tends to shift laterally to the downhill side. In turn, this results in uneven width-wise distribution of crop material delivered to the cleaning system 30 leading to ineffective operation. In such conditions the paddles 82 are operable to guide crop material laterally to counteract the side hill effects and improve uniformity of material distribution to the cleaning system 30.

A paddle controller 138 (FIG. 6) in communication with the ECU is configured to control the paddle control actuator 86. The MOG load sensor 60 described in previous embodiments is utilised to provide to the ECU 101 data that is representative of the distribution of crop material falling from the front edge 32' of return pan 32. However, in this case, a plurality of photoelectric sensing devices are installed, each detecting the thickness of the crop mat falling from respective portions of the front edge 32'. The ECU 101 is configured to generate paddle control settings in dependence upon detection signals received from three photoelectric sensing devices 60-1, 60-2, 60-3.

Four bars or members 61, 62, 64, 65 are secured to the underside of the return pan 32 and each extend forward of the front edge 32'. Each member 61, 62, 64, 65 is substantially planar and is oriented upright to present lateral major surfaces upon which the components of the MOG load sensor 60 are mounted. The three photoelectric sensing devices 60-1, 60-2, and 60-3 each comprise a plurality of LEDs mounted to one one of the members 61, 62, 64, 65 and a plurality of photodiodes mounted to an adjacent one of the members 61, 62, 64, 65. The LEDs output light beams 68 each directed at a respective one of the photodiodes. First device 60-1 detects crop material falling from a right-hand portion of the front edge 32'. Second device 60-2 detects crop material falling from a middle portion of the front edge 32'. Third device 60-3 detects crop material falling from a left-hand portion of the front edge 32'.

In one example scenario, the crop mat falling from the right-hand portion of the front edge 32' may be detected as being thicker than the crop mat falling from the left-hand portion. In this case, the ECU 101 generates a paddle control setting for the paddle controller 138 which causes the paddles to rotate counter clockwise as viewed in FIG. 4. Crop material conveyed generally forwardly on the return pan 32 is thereby guided to the left which improves the width-wise distribution.

In one embodiment the combine 10 also includes a yield sensor 140 which may be positioned in a variety of different known locations. For example, the yield sensor 140 may detect a deflection of the elevator 19. Alternatively, the yield sensor 140 may detect a rate of material flow in the clean grain elevator. In any case, the yield sensor 140 is in wired or wireless communication with the ECU 101 via the databus.

In determination of the material volume, a yield detection signal from the yield sensor 140 may serve as a further input to the ECU 101 wherein a material or MOG volume value is based upon both the detection signals from the MOG volume sensor(s) 60 and from the yield sensor 140. In this case, the inputs of the two detection signals can be weighted so that measurement from the MOG volume sensor 60 is effectively validated or compensated with the knowledge of the grain or crop throughput.

The calculated mat thickness value or MOG volume value is utilised by the ECU 101 as an input parameter for the generation of control signals that serve to command adjustments of the various working units 105, 122, 134, 136, 138 shown connected to the databus in FIG. 6. For example, in one embodiment the MOG volume value is an input parameter for a fan speed control algorithm which is executed locally by the fan speed controller 134 or the ECU 101, wherein the control algorithm operates the speed of fan 34 is set based upon a relationship with the measured MOG volume falling from the return pan 32.

Figure 7:
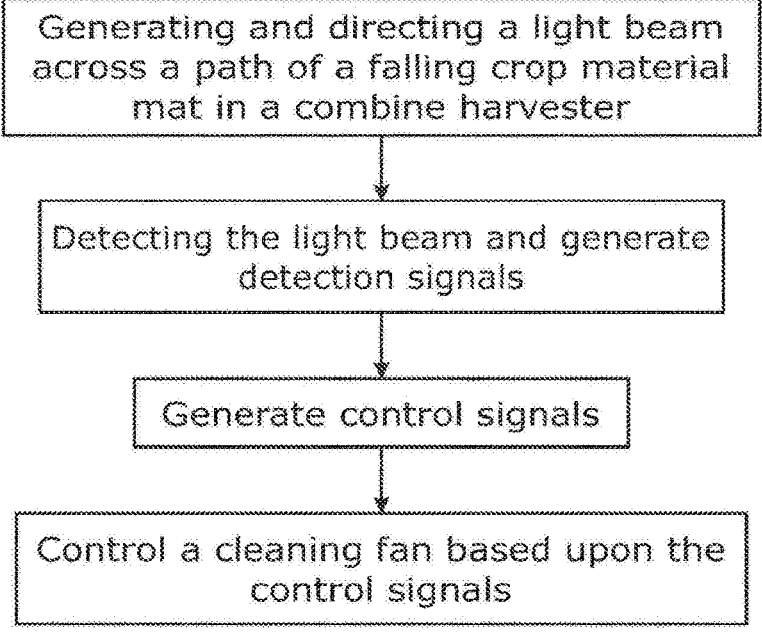

In another embodiment illustrated in FIG. 7, a method of controlling the grain cleaning system 30 includes generating and directing one or more light beams across a path of the crop material mat falling from the front edge 32' of return pan 32. The light beam or beams are detected by photo diodes and electrical detection signals are generated which are communicated to the ECU 101. The ECU then generates control signals from the detection signals. The control signals serve to control a processing sub-system of the combine 10, for example the speed of cleaning fan 34.

In summary there is provided a combine harvester that comprises sensing means to detect or estimate a volume of MOG flowing through crop processing apparatus. A photoelectric sensing device in communication with a controller is arranged forward of, and below, a front edge of a return pan which serves to catch crop material falling from overhead separating apparatus. The photoelectric sensing device generates one or more light beams which are directed across a path of a crop mat as the mat falls under gravity from the front edge. The controller is configured to generate one of a fan speed setting and a sieve opening setting in dependence upon detection signals that are generated by the photoelectric sensing device.

From reading the present disclosure, other modification will be apparent to persons skilled in the art. Such modifications may involve other features which are already known in the field of grain cleaning systems, component parts, and automatic setting systems therefore, and which may be used instead of or in addition to features already described herein.

The invention claimed is:

1. A combine harvester comprising:
a threshing apparatus;
a separating apparatus;
a grain cleaning system located downstream of the separating apparatus;
a material conveyance system arranged to convey crop material from the separating apparatus to the grain cleaning system; and
an electronic control unit (ECU),
wherein the grain cleaning system comprises:
a screening apparatus having at least one adjustable sieve, and
a fan arranged to generate a cleaning airstream through the screening apparatus,
wherein the material conveyance system comprises a return pan positioned below the separating apparatus and serving to catch crop material that falls from the separating apparatus and convey said material as a mat in a forward direction to a front edge of the return pan from where said mat falls under gravity,
wherein a photoelectric sensing device is in communication with the ECU and is arranged forward of, and below, said front edge to generate a light beam across a path of the mat as the mat falls under gravity, and wherein the ECU is configured to generate one of a fan speed setting and a sieve opening setting in dependence upon detection signals generated by the photoelectric sensing device.

2. A combine harvester according to claim 1, wherein the photoelectric sensing device is mounted to the return pan.

3. A combine harvester according to claim 2, wherein first and second members are mounted to the underside of the return pan and extend forwardly of said front edge in a mutually spaced-apart relationship, wherein the photoelectric sensing device comprises a first component mounted to the first member and a second component mounted to the second member.

4. A combine harvester according to claim 1, wherein the photoelectric sensing device comprises a first component mounted to a first sidewall and a second component mounted to a second sidewall, wherein the first and second sidewalls are disposed outboard of the return pan.

5. A combine harvester according to claim 3, wherein the first component comprises a light source and the second component comprises a photodiode.

6. A combine harvester according to claim 3, wherein the first component comprises a light source and a photodiode and the second component comprises a reflective surface for reflecting the light beam.

7. A combine harvester according to claim 1, wherein the photoelectric device comprises a plurality of light sources spaced from one another and arranged to generate a plurality of light beams that are spaced-apart in a fore and aft direction.

8. A combine harvester according to claim 7, wherein the ECU is configured to determine from the detection signals a thickness value that is representative of a thickness of the mat.

9. A combine harvester according to claim 8, further comprising a display device that is in communication with the ECU, wherein the display device is configured to display a representation of a MOG load determined from the thickness value.

10. A combine harvester according to claim 1, further comprising a fan speed controller in communication with the ECU and configured to control the fan speed in dependence on the fan speed setting received from the ECU.

11. A combine harvester according to claim 1, further comprising a sieve controller in communication with the ECU and configured to control opening and closing of the sieve in dependence on the sieve opening setting received from the ECU.

12. A combine harvester according to claim 1, wherein the ECU is configured to generate one of said fan speed setting and said sieve opening setting in dependence upon a grain throughput value received from a yield sensor.

13. A combine harvester according to claim 1, wherein the material conveyance system further comprises a preparation pan disposed upstream of the screening apparatus and below the threshing apparatus, and wherein said mat falls under gravity onto the preparation pan which is located below the front edge of the return pan.

14. A combine harvester according to claim 1, further comprising a plurality of paddles pivotally mounted on the return pan, a paddle control actuator for moving the paddles within a range of operable positions, and a paddle controller in communication with the ECU and configured to control the paddle control actuator, wherein the ECU is configured to generate paddle control settings in dependence upon the detection signals.

* * * * *